(12) United States Patent
Jensen

(10) Patent No.: US 8,262,317 B1
(45) Date of Patent: Sep. 11, 2012

(54) JUVENILE FISH BYPASS SYSTEM

(76) Inventor: Paul Jensen, Madras, OR (US)

(*) Notice: Subject to any disclaimer, the term of this patent is extended or adjusted under 35 U.S.C. 154(b) by 0 days.

(21) Appl. No.: 13/117,897

(22) Filed: May 27, 2011

(51) Int. Cl.
 *E02B 8/08* (2006.01)
 *A01K 63/04* (2006.01)
(52) U.S. Cl. ............... 405/83; 405/80; 405/81; 405/82; 119/219
(58) Field of Classification Search ............ 405/78, 405/80–83; 119/219
 See application file for complete search history.

(56) References Cited

U.S. PATENT DOCUMENTS

| | | | | |
|---|---|---|---|---|
| 5,161,913 A | * | 11/1992 | Boylan | 405/83 |
| 6,325,570 B1 | * | 12/2001 | Pohjamo | 405/81 |
| 8,011,854 B1 | * | 9/2011 | Millard | 405/83 |
| 2008/0101867 A1 | * | 5/2008 | McLaughlin | 405/83 |

* cited by examiner

*Primary Examiner* — Sunil Singh
*Assistant Examiner* — Kyle Armstrong
(74) *Attorney, Agent, or Firm* — Donn K. Harms

(57) ABSTRACT

A device to provide a bypass for fish from an upstream reservoir behind a dam, to a lower elevation downstream reservoir. The device employs a flow separation apparatus for separating aquatic life entering the device and communicated to the downstream reservoir, from a portion of fluid flow communicated to the dam intake. The moving fluid within the device creates turbulence to provide a cushioning effect to protect the fish from impacts, while directing water streams to urge fish to an upper portion of the device distant from the water being communicated to the dam in the lower portion.

13 Claims, 2 Drawing Sheets

JUVENILE FISH BYPASS SYSTEM

BACKGROUND OF THE INVENTION

1. Field of the Invention

The present invention relates to the separation of aquatic life from water. More particularly it relates to an apparatus and method configured for repositioning juvenile salmonid fishes and other aquatic life from water approaching hydroelectric dams or similar man made obstructions, into the water on the lower level downstream of such hydroelectric dams.

2. Prior Art

Fish, much like birds and other migratory animals, rely on natural instincts during seasons of reproduction for their migration from rearing areas in the lower reaches of freshwater system lakes and rivers or from the ocean for anadromous species such as Pacific salmon, back to spawning grounds normally further upstream in freshwater rivers and their tributaries. The next generation of juvenile fish then normally migrates downstream to rearing habitats used by their parents. In this cycle of life which has existed for thousands of years, fish travel in both directions through rivers which provide them a means and route for swimming passage to and from rearing habitats oceans from their breeding/spawning grounds further upstream, rivers, or lakes. In their ultimate quest for spawning and continuing the species, adult fish will travel upstream from the ocean or other water bodies downstream of potential barriers such as hydroelectric dams and the like, to the calm streams and tributaries above such hydroelectric dams, to eventually spawn and ultimately produce juveniles of the next generation. Once these juvenile fish have reached a threshold age or size, their instincts cause them to migrate downstream to rearing habitats where they will grow larger, eventually maturing and become of sufficient size and age to spawn. At that point, the fish which previously reached rearing habitats by traversing past hydroelectric dams and man made lakes, will reverse their original course and endeavor on a hazardous path of travel to home back to the streams and waterways where they originally were spawned.

This natural cycle of such fish ensures their survival as well as the survival of surrounding ecosystems. However, as can be ascertained, even in the best of times, the path of travel from small streams and tributaries to downstream habitats including the ocean for anadromous salmonid, and back again, is hazardous even under the best of conditions on an uninterrupted pathway there between. Man made dams however, offer a major obstacle for fish to traverse downstream as well as upstream in their journey, and thus cause a substantial impediment to this vital cycle. Humans have in recent decades, subsequent to the placement of dams on streams and rivers, recognized the importance of this cycle, and many attempts have been made to remedy the problems encountered by fish in their traverse past dams and other man made obstructions.

A hydroelectric power generating dam typically includes an intake located at position adjacent to the dam and upstream in the forebay portion of reservoir formed behind the dam. Such dams also have an outlet termed the tailrace at a downstream location, potentially hundreds of feet lower than the water upstream of the dam. At the base of the dam, in-between these two water bodies, one or more turbines are generally located in a conduit communicating between water flowing from upstream to downstream levels. The energy of falling water under hydraulic (water) pressure, generally turns the turbine which in turn spins an attached hydroelectric generator, thereby harnessing the energy of water falling to the lower level to generate hydroelectric power.

A grate or other screen is often located at the intake in the upstream reservoir to prevent aquatic life, especially juvenile salmonid fish, and debris from entering the turbine since such a traverse will most certainly kill the fish that are unfortunate enough to encounter the blades of the turbine. This is only of concern during downstream migration of the small fish heading to the ocean as efforts to return upstream have been ongoing through the use of fish ladders that allow fish to traverse upstream past the dams which block their path.

In moving the downstream migrating fish from upper water levels in lakes and reservoirs, to the lower water levels below dams, it is of course the goal to keep a maximum number of fish alive. To that end, many attempts have been made to re-route or re-direct the fish away from the conduits leading to dam turbines, and to the water at lower elevation levels downstream.

In a common means for such fish separation and transport to the lower downstream elevation, the fish are separated from water headed to the turbine with screens. They are thereafter collected in tanks which allow for their transport to the water below the dam at lower elevation levels by pipeline or truck. Commonly, fish are gathered in the upstream reservoir, deposited in a tank which is either on or engaged upon a truck, and then transported to the down stream location. Once at the lower elevation the fish are reunited with the waterway.

This arduous path, as can be imagined, can cause very serious problems. One recently identified problem occurs when the fish experience a large interruption in their downward migration from the reservoir behind a dam, to the waters at lower elevation. When fish are transported many miles downstream of the dam and released, and thereby do not actually swim and experience the distance between the point they were gathered into the truck, and the point they are placed back into the river downstream. It has recently been identified, that this trucking of fish can cause a lapse of instinctive migration during the transport period. Not having experienced being in the entire waterway downstream, the fish may lack the ability to follow the pathway back to the spawning grounds during a return trip reducing the number of spawners in the next generation, and causing fish to stray and spawn in the wrong streams and habitats, thereby reducing the adaptation of the fish populations that are native to these habitats. Furthermore, the combination of crowding and stress in transport tanks and problems keeping proper temperature and oxygen levels in tanks transport tanks can cause injury and/or delayed loss of life to the transported fish.

Another means is to simply create a manmade stream or river to bypass the dam and allow the fish to rely on instinctive abilities alone as seen in U.S. Pat. No. 6,652,189 to Burns, II. This however is not economical or practical when upstream and downstream locations are miles apart.

Further prior art attempts are seen but similarly fall short. U.S. Pat. No. 5,660,499 to Bethune teaches a fish siphon and overpass to transport fish upstream and downstream. Bethune however employs many moving parts that may require routine as well as unexpected maintenance that only adds to the costs and time associated with current hydroelectric power systems. Bethune discloses a siphon that may require the transport of fish through great vertical distances without care given to fish safety. Environmental regulations limit the speed at which fish can be transported through flow channels and Bethune does not address this. Furthermore, since many dams employ successful fish ladders for upstream migration as previously mentioned, the need for both downstream and upstream migration passageways at the dam site itself is unnecessary.

U.S. Pat. Nos. 6,394,699 to Neufeld, and 6,273,639 to Eikrem et. al. teach similar means to bypass dams and other manmade obstructions. They too fall short in that many moving parts are employed and may require a complete overhaul of an existing dam if they are intended to be used.

As such there is a continuing and unmet need for a simple and low maintenance device and method allowing for the elevational transport of fish and other aquatic life, from higher level waters above a hydroelectric dam or other manmade obstruction, to the lower elevation waters downstream. Such a device should effectively not scare or cause the fish to avoid it and should employ natural currents to encourage the fish within the passageway of the device to traverse there through in a manner that is concurrent to the instinctive nature of the fish. Such a device should also be safe and comply with environmental regulations. Finally, such a device should be easily installed and be adaptable to existing dam structures, and the many different traverses of elevation fish heading downstream must endure.

SUMMARY OF THE INVENTION

The device herein disclosed and described provides a solution to the shortcomings in prior art and achieves the above noted goals through the provision of a juvenile fish and other macro-organism separation and downstream transport device and method. The device is simple in operation and provides unharmed current-induced urging and repositioning of aquatic life, such as juvenile and adult fish, into transporting conduits through the employment of a series of conduits and currents. The device thereby provides a means to direct fish migration away from the water intake of a hydroelectric power system tunnel at the higher water elevations behind an existing dam structure, and into a transport conduit providing aquatic transport to the lower water bodies below the dam.

The device employs a first conduit structure including an inlet and a plurality of operatively sized outlets for both water and fish. The inlet intakes water and aquatic life, preferably fish, migrating toward the dam from an upstream reservoir formed behind the hydroelectric dam. In a particularly preferred mode a first and second outlet located along the length of the first conduit, and spaced apart at operative distances respectively, provide a means to direct fluid flow entering the first conduit structure, to a second conduit which operatively communicates the water to the intake tunnel of the existing hydroelectric power system.

Fluid flow is naturally drawn through the fish bypass device due to the nature of hydroelectric dams in which water is drawn into the intake tunnel by gravity. The bottom-oriented outlets communicating with the power intake tunnel employ mesh screens or grates to insure fish who inadvertently leave the currents, urging them away from the outlets, are not communicated into the intake tunnel. However, in general fish do not encounter the screens as they are directed to the top of the conduit by a hydraulic cushion imparted by a turbulent boundary layer formed above the screens.

A particularly important internal component of the fish bypass device is a substantially perpendicular internal weir, extending upward from a lower interior surface of the conduit structure. The weir is generally located between the first and second bottom hydro outlets and is designed to operatively engage to the screen or grate covering the first outlet communicating water to the dam turbines. The engagement of the screen to the elevated distal end of the weir, is positioned an angling of the screen or grate to the height of the weir of approximately thirty degrees. This combination of an angled screen and weir, acts to induce a hydraulic cushion in the water flow as a result of a turbulent boundary layer formed above the screen which serves as a means to deflect the fish away from a contact and any resulting injury such contact with the screens might cause, and also serves to prevent a communication of the fish to either of the first and second outlets. The formed hydraulic cushion, in addition to preventing contact, abrasion, and other harm, serves to provide a means to accelerate the fish through the remaining void within the interior of the first conduit structure adjacent the weir ultimately toward the third (fish) outlet.

This formed boundary layer or hydraulic cushion also tends to deflect debris pieces away from the screens over the hydro outlets. Furthermore the creation of the boundary layer above the screen and in the region directly downstream from the weir, and the nature of the fluid flow therein, provides an impediment to swimming against the current formed therein and a means to discourage fish from swimming back upstream past the weir.

As a means to encourage fish to enter the fish bypass conduit structure, it either has an aperture formed in a top wall, or employs one or a plurality of substantially translucent window sections located along the top wall of its length. Overhead light helps encourage fish entry into the bypass conduit by communicating light into the device. Overhead light also acts to orient and naturally urge the fish toward the light, and to the upper portion of the bypass conduit away from the unsafe screens and entrances into the dark bottom conduits to the turbines.

The fish bypass structure further comprises a third (fish) outlet located at its distal or terminating end. The third outlet is engaged substantially coaxially inline with the inlet, and further downstream through the device from the first and second bottom screen hydro outlets. The third outlet directs the fish that were urged away by formed currents in the device, and remaining water which did not pass through the first and second outlets, and relative small pieces of debris into an intermediate conduit or pipe generally of substantially less diameter than the inlet. This intermediate pipe can be selectively arranged and oriented to provide a water filled conduit past a dam structure either over the top (in siphon mode) or passing laterally there around the dam or obstacle.

The fish exit end of the conduit leading from the third outlet communicates with the water downstream of the dam-formed reservoir at the lower elevation. Again, due to gravity and suction induced flow, no outside power means is necessary to maintain fluid flow. Fish communicated to the lower elevation waters adjacent to the bottom of the dam, thereafter may swim the distance to the next dam and device, or the ocean, and experience the needed natural learning from such a traverse to thereby remember the required path for a return trip.

It is common for upstream and downstream reservoirs to span long horizontal and vertical distances. As such the fluid flow within the intermediate pipe or conduit has the potential to generate highly increased fluid flow speed during its traverse and eventual exit downstream. Some environmental regulations relating to speeds at which fish may be transported are in effect to assure changes in acceleration, or deceleration when stopping, do not harm or kill the fish. However, in the apparatus and method herein described the fish are traveling with the flow of fluid and are essentially not moving relative to the flowing water and can be accelerated to minimize their occupancy time within the conduit to further avoid injury.

As the fish traverse the conduit and reach the downstream reservoir or river, which may be moving more slowly than the fluid through the conduit, a means for de-accelerating the fish and water should be employed. In a particularly preferred mode of the device, a means to slow fluid flow at the exit of the conduit leading from the device is accomplished by a series of successively increasing diameter pipes or conduits leading to the communication with the downstream reservoir or river. The basic laws of fluid mechanics provide that with increasing diameter of the conduit, there is a decrease in mean flow velocity of the fluid. It is particularly preferred that the succession of successively increasing diameter sections of the conduit, are employed to provide a means to decelerate the mean fluid flow to communicate the fish to the downstream water at speeds which are within standards of regulations.

With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention.

It is an object of the invention to provide a simple, safe, easy to manufacture, install, and maintain fluid channeling device for the separation and transport of juvenile fish and other aquatic macro-organisms downstream around a hydroelectric power generating dam.

It is another object of the invention to employ the flow characteristic inherent in the hydroelectric system to drive and maintain fluid flow in the device.

It is a further object of the invention to provide a conduit structure employing a plurality of outlets for redirecting fluid flow for optimum transport of fish and other aquatic life as well as flow to the operative turbine intake in the dam.

A further object of the invention is the provision of an internal weir to create boundary layers and regions of controlled turbulence to form a hydraulic cushion and thereby to ensure proper transport of fish and aquatic life downstream only.

Still an object of the invention is to provide a series of successively increasing diameter pipes or conduits located at the downstream exit of the device to incrementally decrease the mean fluid flow required dictated by environmental regulation.

BRIEF DESCRIPTION OF DRAWING FIGURES

DETAILED DESCRIPTION OF THE PREFERRED EMBODIMENTS OF THE INVENTION

Figure 1:
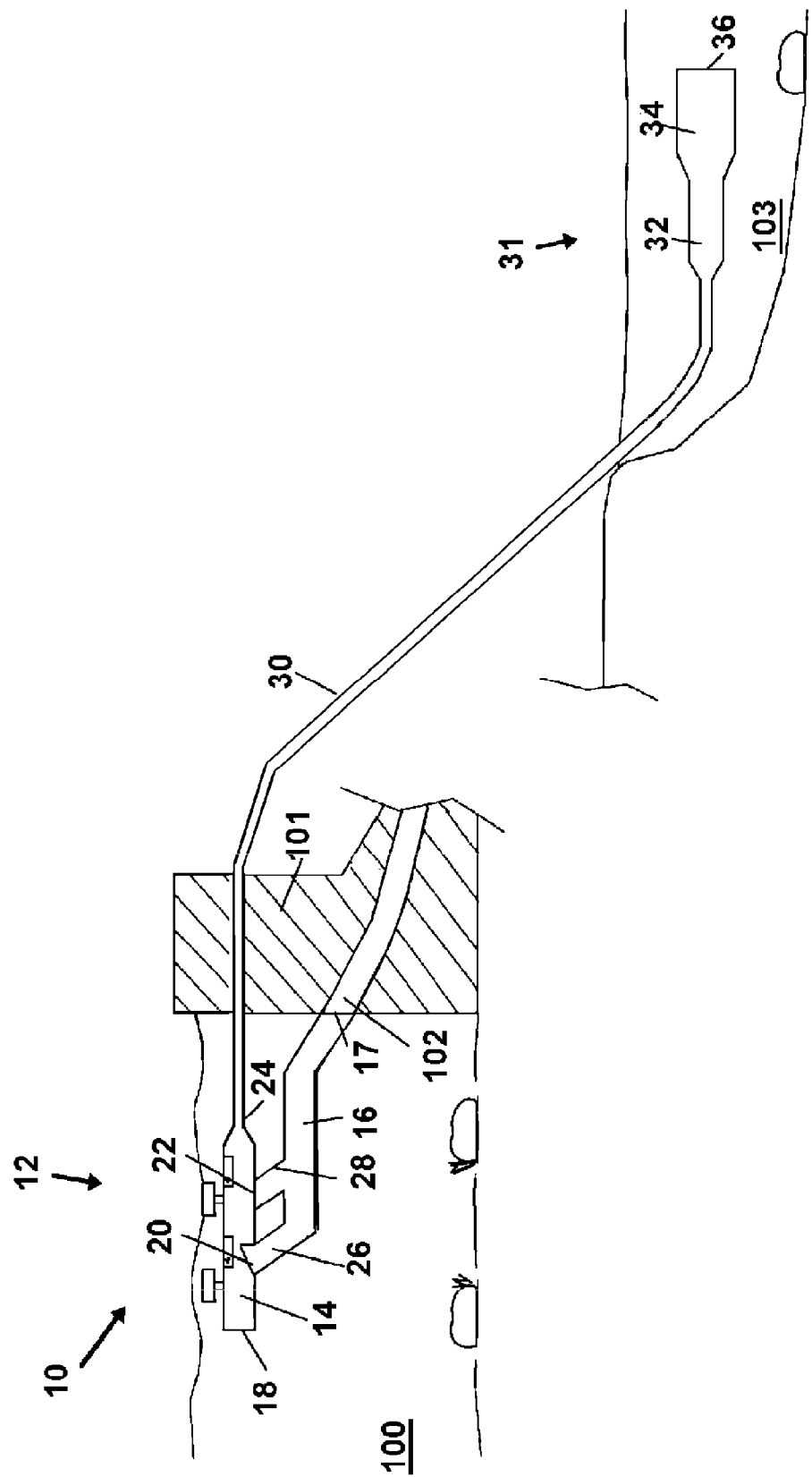
FIG. 1 shows a side cross sectional depiction of the complete assembly of the device depicting upstream and downstream reservoirs and the communication through the dam at a level under water, of the conduit carrying fish.
Figure 2:
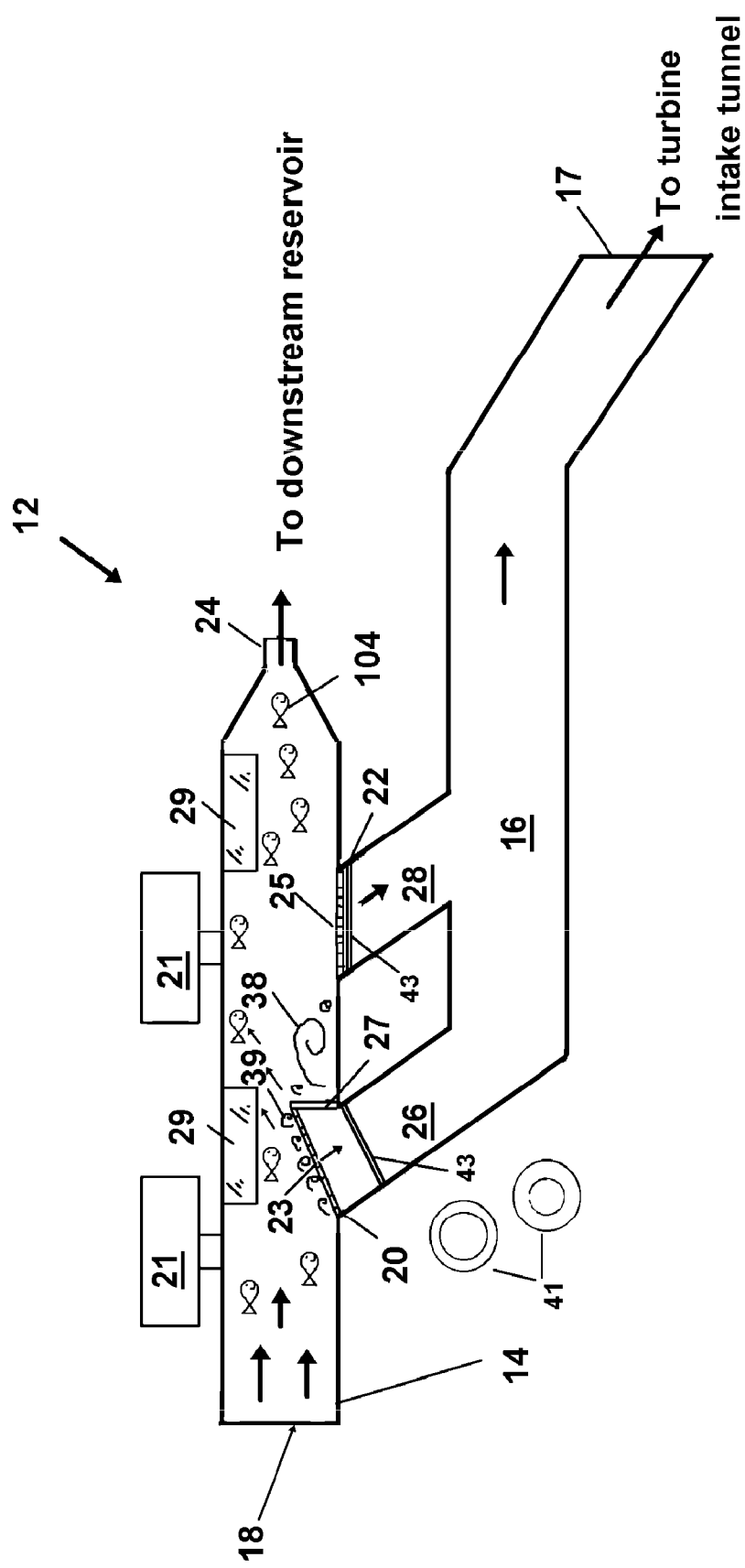
FIG. 2 is a more detailed side cross sectional depiction of the upstream portion of the device.

Now referring to drawings in FIGS. 1-2, wherein similar components are identified by like reference numerals, there is seen in FIG. 1 a side cross sectional view of the complete assembly of the device 10 in an as-used position where incoming fish in the upstream reservoir 100 are separated and communicated to water at a lower level downstream from the dam or other impediment to such travel. The device 10 comprises generally of and upstream portion 12 communicating through a sealed conduit with a downstream portion 31. A detailed view of the upstream portion is depicted and will be described in FIG. 2 shortly.

The upstream portion 12 in the as-used position, is submerged within the upstream reservoir 100 near the hydroelectric dam 101 preferably near the hydroelectric system turbine intake tunnel 102. Water is communicated through the upstream inlet 18 and flows to the electrical generation intake conduits, through a preferably round or tubular first conduit structure 14 and a subsequent second conduit structure 16. The conduits are of generally lightweight material such as plastic which is resistant to water corrosion and light degradation.

The inner diameter of the upstream inlet 18 of the first conduit structure 14, and lower or second conduit structure 16 in a particularly preferred mode are substantially equal. Additionally, the inner diameter of the first conduit 14 and communication conduits 26 and 28 in a particularly preferred mode are sized at a rate of two to one. That is to say conduit diameter of the first conduit structure 14 communicating at the inlet 18 in a currently preferred mode, is two times the diameter of either of the respective communication conduits 26 and 28 which are both substantially equal in interior diameter and communicate fluid to a downstream exit 17. Further, experimentation has found excellent flow results in the intermediate conduit 30 where the third outlet 24 communicating thereto 24 is one fourth the diameter of inlet 18.

As an example, if the diameter of the upstream inlet 18 is 24 inches, the respective diameters of the communication conduits 26 and 28 will each be 12 inches and the third outlet 24 will be 6 inches. This current ratio yields a fluid flow through the device which moves the fish and water very well to the downstream reservoir. This ratio can vary of course and can be affected by the larger or smaller diameter of the third outlet 24 which transports the aquatic life, preferably fish, downstream of the dam 101.

Positioning and current and temperature can also effect the fluid flow of the water and may require fine tuning of the inlet and outlet flows of the upstream portion 12. Should such adjustment be necessary when the device is placed in its as-used position of FIG. 1, the diameters, and hence the flow volume characteristics of one or both of the communication conduits 26 and 28, may be adjusted. This adjustment between the water or fluid intake flow volume and total outflow from the communication conduits may also be performed to optimize the fluid flow to a larger or smaller diameter of third outlet 24 or for a change in the diameter of the upstream inlet 18.

Means to adjust the fluid flow through the conduits 26 and 28 may be provided by inserts 41 which may be slid therein through a slot 43 formed in the sides of the conduits 26 and 28. The inserts 41 may have varying interior diameters to thereby vary the flow therethrough and the exiting fluid flow volume. The inserts 41 may be from a kit of such inserts 41 featuring a plurality of differently sized interior diameters. The slot 43 has rubber or other fluid seals thereon to provide a means to seal the slot 43 with the insert 41 engaged therein to minimize water loss during operation of the device 10 or eliminate it.

However, many other sizes and dimensional relationships can be employed other than the preferred dimensions set forth in this application that similarly obtain reasonable fluid flow results within the scope of the invention, and therefor should not be considered limiting. The ratio of conduit diameters may also be changed in relationship to the size of the openings in the grates or mesh screens 23 and 25 which affect the fluid flow communicated to the conduits 26 and 28. It must also be note that the figures are not to scale.

Fluid and aquatic life enter the device 10 at the inlet 18 located at the upstream end of the upstream portion 12. A first outlet 20 and second outlet 22 communicate fluid to the second conduit structure 16 via a first communication conduit 26 and second communication conduit 28. The second conduit structure 16 employs a downstream exit 17 that operatively engages with the turbine intake tunnel 102 of the hydroelectric power generating dam 101. Means of engagement of the second conduit structure 16 to the turbine intake tunnel 102 would be proximate to the entrance to the intake tunnel. As such it is preferred that the interior diameter of the second conduit structure 16 be operatively sized to engage with an existing turbine intake tunnel 102.

As noted, in a particularly preferred mode the communication conduits 26,28, to achieve the noted ratio with the intake for example of twelve inches, are sized in an interior diameter of 12 inches, to achieve the fluid flow ratio of two to one. However various other sizes and dimensions may be employed to achieve the same goal while maintaining the intended scope of the device 10 and should not be considered limiting. Factors that may preclude various dimension modifications include flow rate requirements dictated by the hydroelectric dam turbine, size of aquatic life, as well as others that become apparent when the device is fitted to the as-used position, due to the nature of the dam system and reservoir habitat, as well the basic principals of fluid mechanics such as those set forth by Bernoulli's equation.

Grates or mesh screens 23 and 25, (FIG. 2), located at the first and second outlets 20,22 in the communication with the first conduit structure 14, provide a means to communicate only fluid to the hydroelectric dam intake tunnel 102, while aquatic life remain in the first conduit structure 14 and are directed toward a third outlet 24 that is downstream and coaxially aligned with the inlet 18 of the first conduit structure 14. The third outlet 24 in a particularly preferred mode to be sized at a rate of four to one relative the inlet 18. With the noted diameter of the inlet 18 of 24 inches, the third outlet 24 may be between 4 and 8 inches in diameter with 6 inches in diameter being a preferred size. Again it must be noted that various other modifications can be made to the preferred dimensions set forth by the applicant while those disclosed are for demonstrative purposes only and should not be considered limiting.

There is an intermediate pipe or conduit 30 that is engaged to the third outlet 24 on the first conduit structure 14. The conduit 30 extends below the surface of the water in the upstream reservoir 100, through a passage, or existing conduits and passageways in the dam structure, to the downstream reservoir 103. Fish traversing the device 10, travel through the conduit 30, to the downstream reservoir 103, thereby bypassing the dam 101 as desired by the scope of the invention. This conduit 30 provides thereby provides a means to transport thousands of fish and other aquatic life from the upstream reservoir 100 past the dam to the downstream reservoir 103, with virtually no injuries to any fish in the group.

Although environmental regulations sometimes dictate the maximum speeds at which fish can be transported in such conduits 30, during the decent of the fish in canals and the like. However the relative speed of the fish traversing within the conduit 30 is substantially zero since the fluid is moving withing the conduit 30 and the fish are along for the ride. Therefor the conduit 30 may extend over great vertical and horizontal distances to transport the fish at much higher speeds than conventionally available and do so without harming the fish.

However, once reaching the downstream reservoir 103 it is of great importance to decelerate the moving fluid from within the intermediate conduit 30 as a large vertical drop greatly increases the speed of the moving fluid. It is also importing to provide a means to slow the water in a manner that does not kill or cause harm to the fish. This means to slow the water flowing from the intermediate conduit 30 is achieved at the downstream portion 31 of the device 10 which is disposed below the surface of the water in the downstream reservoir 103. So positioned the termination end of the conduit 30 is operatively communicated through one or a series of increasing diameter conduit sections. Basic laws of fluid mechanics tell us with increasing diameter there is decrease in mean flow. A simplified equation may be given by $$V_1 \cdot A_1 = V_2 \cdot A_2$$

where V is velocity, A is cross-sectional area, and subscripts 1 and 2 correspond to initial and final properties of the respective portions of the device where cross sectional area is increasing. Essentially each increase in diameter 32 of the conduit will slow the velocity of the fluid entering it.

A first step increase in diameter 32 is shown as the intermediate conduit 30 enters the downstream reservoir 103. The depiction further shows a second increase in diameter 34 before reaching the exit 36 into ambient flow of the downstream reservoir 103. It must be noted that the device 10 may employ one or a plurality of such stepping diameter increases as well as various dimensions of such steps as dictated by the flow requirements. As such, the overall construction and dimension of the downstream portion 31 of the device 10 will vary between as-used or employed applications of the device 10 and should not be considered limited by the depiction set forth. However means to slow the fish by slowing the velocity of the water may be provided by communicating the water from the distal end of the intermediate conduit 30 with increased diameter conduits for a gradual slowing of the velocity which will not injure the fish, and which they probably will not notice.

Although a brief description of the device 10 has been stated a detailed depiction of the upstream portion 12 will be described in FIG. 2.

The upstream portion 12 of the device 10 as depicted in FIG. 2 shows the first 14 and second 16 conduit structure. As stated previously these structures fluidly communicate via first and second 26,28 communication conduits located at the respective first and second outlets 20,22 in the first conduit structure 14.

In all modes of the device it is important that a weir 27 is employed and vertically disposed at a location adjacent to the first outlet 20. The length of the weir 27, to its distal end preferably spans vertically ½ to ⅔ the interior diameter of the first conduit structure. The weir 27 is a solid barrier and does not pass fluid.

An angled grate or screen mesh 23 is employed over the first outlet 20 and extends from the lower interior surface of the first conduit structure 14 to the distal end of the weir 27 as depicted. The mesh 23 only permits fluid to transfer into the first communication conduit 26 and second conduit structure 16 defining flow that is directed to the hydroelectric dam intake 102 (FIG. 1). The mesh may be between 20 to 80 percent solid depending on the as-used installation, that is to say it may have apertures allowing water passage over 20 to 80 percent of its area with a current favorite being between 45 to 75 percent open area.

In use, the flow of fluid (depicted by the arrows) encounters the first angled screen mesh 23 which induces a tsunami effect to the fluid flow or turbulent eddies which thereby creating a hydraulic cushion 39. This cushion 39 provides means to deflect fish 104 and other aquatic life away from the screen mesh 23 and also accelerates them over the distal end of the weir 27 into the upper portion of the first conduit structure 14 which can be defined by the area past the distal end of the weir 27 above an imaginary horizontal line ending at the third outlet 24. This places the fish within the upper portion in a fluid flow moving toward the third outlet and away from possible contact with both conduits 26 and 28 which draw water from a lower portion of the first conduit structure 14 below the distal end of the weir 27.

As flow continues past the weir 27, additional fluid is directed through the second outlet 22. This outlet similarly employs a screen mesh 25 with similar open space characteristics to that of screen mesh 23. In a particularly preferred mode the screens are of 1/8" mesh that permit 60% flow rate through them.

Having been accelerated by the fluid traveling past the distal end of the weir 27 into the upper portion or half of the conduit structure 16, the remaining flow and fish 104 are directed by the current of the water, to the third outlet 24 that transports them to the downstream reservoir 103 via intermediate conduit 30 as previously described. It is the cushioning 39 provided by the water of the screen mesh, and the acceleration along the angle of the screen mesh to the upper half of the conduit structure 16 which keeps any fish from striking solid structures during their traverse to the intermediate conduit 30. The accelerated water flow and cushioning of the turbulent flow provides an excellent means to prevent a striking by the fish 104 against any solid structures at a force that would harm them. The fish 104 traversing the distal end of the weir 27 at an upward angle of acceleration, are thus caught in an internal tsunami that carries them to the intermediate conduit 30.

The first conduit structure 14 also preferably employs one or a plurality of transparent sections 29 adjacent to the upper half, to allow ambient light to enter the conduit as an attractant to fish.

It should be noted that because of the accelerated fluid flow in the narrow section at the distal end of the weir 27, there is generally formed a turbulent eddy 38 produced behind the weir 27 and pushing in a direction away from it. In use the fish 104 who are not accelerated in the angled fluid flow to the upper half of the conduit, are still substantially unable to swim back upstream past the turbulent eddy 38. A great advantage is achieved in the device 10 in that once fish are attracted into the conduit they are unable to swim back to the upstream reservoir as desired by the scope of the invention.

In the as-used position installed between two reservoirs of water, the upstream portion 12 may be supported by one or a plurality of floats 21 engaged generally on the first conduit structure 14. This will allow the device 10 to be suspended and distance from the top surface of the water and allow the device to be situated to continually maintain the inlet 18 below the surface of the reservoir in which it sits, even if the level changes.

While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention. Consequently, all such modifications and variations and substitutions are included within the scope of the invention as defined by the following claims.

What is claimed:

1. A flow separation apparatus for separating aquatic life from fluid flow entering a dam intake in an upstream reservoir and fluidly transporting said aquatic life to a downstream reservoir at a lower elevation, comprising:

a first component, said first component having a first conduit structure defined by an interior surface of a surrounding sidewall, said interior surface communicating with a fluid inlet at a first end for receiving water and fish from below a surface of said upstream reservoir, and with a first exit aperture at a second end opposite said first end;

a first communication conduit having an intake aperture in sealed communication with a lower end of said first conduit structure and said dam intake;

a second communication conduit communicating between an opening in said lower end of said first conduit structure, and said dam intake;

an intermediate conduit communicating said second end of said first conduit structure and a second exit aperture positioned below the surface of said downstream reservoir;

a vertically disposed weir extending from a first end adjacent to said interior surface of said sidewall at a position between said first communication conduit and said second communication conduit, to a distal end;

a screen positioned to filter all fluid flow through said intake aperture to said dam intake, said screen extending from a first edge adjacent to said interior surface, to a second edge at said distal end of said weir;

a narrowed area of said first conduit structure, said narrowed area defined by said distal end of said weir, and said interior surface opposite thereto;

said screen and said incline providing a means to induce turbulence in said water flowing adjacent to said screen;

said incline providing a means to induce an inclining trajectory to a stream of said water flowing from said fluid inlet and over said screen, through said narrowed area;

said turbulence providing a means to prevent contact by fish with said screen;

said stream providing a means to fluidly urge fish through said narrowed area with said stream and into a positioning in said upper portion of said first conduit structure;

said second communication conduit communicating a portion of said water traversing said narrowed portion, from a lower portion of said first conduit structure, to said dam intake; and said intermediate conduit communicating said fish traversing said narrowed area to said upper portion, within a remainder water stream and through said exit aperture positioned under the surface of said downstream reservoir, whereby fish entering said first conduit structure are prevented from contact with said screen by said turbulence and traverse said narrowed area within a stream of water to said upper portion, distant from said lower portion being communicated to said dam intake, and thereafter through said intermediate conduit to said lower reservoir, thereby providing a means to separate said fish from water entering said dam intake.

2. The flow separation device of claim 1, additionally comprising:
said second exit aperture having one or a plurality of sequentially increasing cross-sections; and
said increasing cross-sections proving incremental means to slow communication of said fish, with said downstream reservoir.

3. The flow separation device of claim 1, additionally comprising:
one or a plurality of inserts configured for sealed removable engagement within one or both of said first communication conduit and said second communication conduit;
said inserts having a body portion with an exterior circumference configured substantially equal to or slightly less than a circumference of said first communication conduit and said second communication conduit;
said inserts having an aperture communicating said body portion, said aperture sized smaller than said diameter of said first communication conduit and said second communication conduit; and
insertion of a said insert within either of said first communication conduit and said second communication conduit providing means to regulate the volume of water flowing therethrough, whereby water flow communicating through said separation device can be tuned to site specific requirements.

4. The flow separation device of claim 2, additionally comprising:
one or a plurality of inserts configured for sealed removable engagement within one or both of said first communication conduit and said second communication conduit;
said inserts having a body portion with an exterior circumference configured substantially equal to or slightly less than a circumference of said first communication conduit and said second communication conduit;
said inserts having an aperture communicating said body portion, said aperture sized smaller than said diameter of said first communication conduit and said second communication conduit; and
insertion of a said insert within either of said first communication conduit and said second communication conduit providing means to regulate the volume of water flowing therethrough, whereby water flow communicating through said separation device can be tuned to site specific requirements.

5. The flow separation device of claim 1, additionally comprising:
said first component supported with said fluid inlet below said surface of said upstream reservoir by one or a plurality of floats engaged thereto.

6. The flow separation device of claim 2, additionally comprising:
said first component supported with said fluid inlet below said surface of said upstream reservoir by one or a plurality of floats engaged thereto.

7. The flow separation device of claim 3, additionally comprising:
said first component supported with said fluid inlet below said surface of said upstream reservoir by one or a plurality of floats engaged thereto.

8. The flow separation device of claim 4, additionally comprising:
said first component supported with said fluid inlet below said surface of said upstream reservoir by one or a plurality of floats engaged thereto.

9. The flow separation device of claim 1, additionally comprising:
one or a plurality of light transmitting sections formed in said sidewall above said upper portion of said first conduit structure; and
light transmitted through said sections providing means to attract fish to swim toward said upper portion.

10. The flow separation device of claim 2, additionally comprising:
one or a plurality of light transmitting sections formed in said sidewall above said upper portion of said first conduit structure; and
light transmitted through said sections providing means to attract fish to swim toward said upper portion.

11. The flow separation device of claim 4, additionally comprising:
one or a plurality of light transmitting sections formed in said sidewall above said upper portion of said first conduit structure; and
light transmitted through said sections providing means to attract fish to swim toward said upper portion.

12. The flow separation device of claim 8, additionally comprising:
one or a plurality of light transmitting sections formed in said sidewall above said upper portion of said first conduit structure; and
light transmitted through said sections providing means to attract fish to swim toward said upper portion.

13. An apparatus for separating fish from a hydroelectric dam intake in a first reservoir and communicating them to a second reservoir at a lower elevation, comprising:
a separator component having a first conduit structure defined by a sidewall communicating therethrough between an inlet and an outlet;
means to position said separator to an as-used position below a surface of said first reservoir where water from said first reservoir communicates through said inlet into said first conduit structure;
said separator component in said as-used position having an upper portion of said first conduit closest to said surface of said water, and having a lower portion of said first conduit closest to a bottom of said first reservoir;
a first communication conduit having an intake aperture in sealed communication with said lower portion of said first conduit structure at one end and at an opposite end with said dam intake;
a second communication conduit having an intake opening in sealed communication with said lower portion of said first conduit structure at one end and at an opposite end with said dam intake;
an intermediate conduit communicating from said outlet of said first conduit structure and an exit aperture positioned below the surface of said second reservoir;
a vertically disposed weir extending from a first end adjacent to said interior surface of said sidewall at a position between said first communication conduit and said second communication conduit, to a distal end;

a screen positioned to filter water flowing through said intake aperture to said dam intake, said screen extending at an upward angle from a first edge adjacent to said sidewall at said lower portion of said first conduit structure to a second edge at said distal end of said weir adjacent to said upper portion of said first conduit structure;

a narrowed area of said first conduit structure, said narrowed area defined by said distal end of said weir, and said sidewall, said narrowed area communicating said water to said upper portion of said first conduit structure;

water moving from said inlet of said first conduit structure toward said outlet producing turbulence above said screen;

said screen and said incline thereof, providing a means to induce an inclining trajectory to a stream of said water flowing from said fluid inlet and over said screen and through said narrowed area;

said turbulence providing a means to prevent contact by fish with said screen;

said stream providing a means to fluidly urge fish through said narrowed area and into a positioning in said upper portion of said first conduit structure;

said second communication conduit communicating a portion of said water traversing said narrowed portion, from a lower portion of said first conduit structure, to said dam intake; and said intermediate conduit communicating said fish traversing said narrowed area to said upper portion, within a remainder water stream and through said outlet to said exit aperture positioned under the surface of said second reservoir, whereby fish entering said first conduit structure are prevented from contact with said screen by said turbulence and traverse said narrowed area within a stream of water to said upper portion, distant from said lower portion being communicated to said dam intake, and thereafter through said intermediate conduit to said lower reservoir, thereby providing means to separate said fish from water entering said dam intake.

* * * * *